(12) United States Patent
Abe et al.

(10) Patent No.: US 6,462,509 B1
(45) Date of Patent: Oct. 8, 2002

(54) NON-CONTACT CHARGER

(75) Inventors: Shigeo Abe, Tsurugashima (JP); Hideki Kojima, Tsurugashima (JP)

(73) Assignee: Toko Kabushiki Kaisha, Tokyo-To (JP)

( * ) Notice: Subject to any disclaimer, the term of this patent is extended or adjusted under 35 U.S.C. 154(b) by 0 days.

(21) Appl. No.: 10/029,454

(22) Filed: Dec. 26, 2001

(30) Foreign Application Priority Data

Dec. 27, 2000 (JP) ........................................ 2000-397836

(51) Int. Cl.$^7$ ................................................. H02J 7/00
(52) U.S. Cl. ....................................................... 320/108
(58) Field of Search ................................ 320/108, 107, 320/109; 336/DIG. 2

Primary Examiner—Gregory J. Toatley, Jr.

(74) Attorney, Agent, or Firm—Pillsbury Winthrop, LLP

(57) ABSTRACT

A non-contact charger wherein a battery-driven electronic device containing a secondary battery is provided in a power supply section and electrical power is supplied thereto by non-contact, the non-contact charger including: a primary side coil and a secondary side coil, the primary side coil supplying power to the secondary side coil by electromagnetic induction, the primary side and secondary side coils being provided to face each other with a case therebetween; the primary side coil containing a U-shaped magnetic core having a leg at each end thereof, and windings which are wound around the magnetic legs; and the secondary side coil containing a U-shaped magnetic core having a leg at each end thereof, and a winding which is wound around a common magnetic core of the U-shaped magnetic core; the cross-sectional area of the magnetic legs of the primary side coil being greater than the cross-sectional area of the magnetic legs of the secondary side coil.

4 Claims, 2 Drawing Sheets

NON-CONTACT CHARGER

BACKGROUND OF THE INVENTION

1. Field of the Invention

The present invention relates to a non-contact charger which uses electromagnetic induction to transmit electrical power between a primary coil and a secondary coil which are independent of each other.

2. Description of the Related Art

A non-contact charger comprises a primary side circuit and a secondary side circuit, which are independently mounted inside a case, and must efficiently transmit a large amount of electrical power from the primary side circuit to the secondary side circuit. An important factor in accomplishing this is to increase the magnetic transmission efficiency.

One conventional method of increasing the magnetic transmission efficiency is to use U-shaped magnetic cores as the primary side and secondary side coils. The coils are divided and wound around magnetic legs at each end, thereby increasing the size of the magnetic leg faces of the opposing magnetic cores and the opposing faces of the coils.

With regard to magnetic transmission efficiency, it is effective to increase the cross-sectional area of the magnetic core and the coil in the secondary side circuit. However, due to the demand for small-scale and portable devices, there are limits on the size of this area, and also on the sizes of the magnetic core and coil which can be mounted in the secondary side case, consequently limiting the power which can be transmitted. FIG. 4 shows a conventional small-scale portable non-contact charger.

In FIG. 4, reference code A represents a primary side coil, and reference code B represents a secondary side coil. Reference code 11 represents one section of the case of the primary side coil A, reference code 12 represents a U-shaped magnetic core used in the primary side coil A, reference code 13 represents a winding which is wound around the magnetic leg of the U-shaped magnetic core 12 of the primary side coil A, reference code 14 represents one section of the case of the secondary side coil B, reference code 15 represents a U-shaped magnetic core used in the secondary side coil B, and reference code 16 represents a winding which is wound around the magnetic leg of the U-shaped magnetic core 15 of the secondary side coil B. The primary side coil A and the secondary side coil B are formed by winding the windings 13 and 16 around the magnetic legs at each end of the magnetic cores 12 and 15, and arranging the magnetic legs so as to face each other with the cases 11 and 14 therebetween.

FIG. 5 shows the distribution of magnetic flux in this constitution, and uses the same reference codes as those in FIG. 4.

In FIG. 5, magnetic flux is generated in the primary side coil A, and follows a path around the magnetic legs 12a and 12b on each side of the U-shaped magnetic core 12, around the magnetic legs 15a and 15b at each end of the U-shaped magnetic core 15 of the secondary side coil B, thereby forming a closed magnetic path for transmitting power to the secondary side coil B.

One conceivable method for improving the magnetic coupling between the primary side coil A and the secondary side coil B is to increase the cross-sectional areas of the magnetic legs 12a, 12b, 15a, and 15b of the magnetic cores 12 and 15 of the secondary side coil B and the primary side coil A in order to transmit as much of the magnetic flux as possible from the primary side coil A to the secondary side coil B. The distance between the magnetic legs 12a and 12b (open end sides) at each end of the primary side coil A could also be increased to prevent the magnetic flux from passing through the secondary side coil B, thereby reducing the magnetic flux (leaked flux) x which returns directly to the primary side coil A.

However, since the winding 16 is wound around the magnetic legs 15a and 15b at each end of the U-shaped magnetic core 15 of the secondary side coil B, consideration must be given to providing a space for the winding 16. For this reason, it is extremely difficult to increase the cross-sectional areas of the magnetic legs 15a and 15b, and to increase the distance between the magnetic legs 15a and 15b at each end of the U-shaped magnetic core 15, in portable electronic devices which must be made thin and small.

SUMMARY OF THE INVENTION

It is an object of the present invention to provide a non-contact charger wherein the secondary side coil can be made small and thin, and having increased magnetic transmission efficiency.

In order to achieve the above objects, the present invention provides a non-contact charger wherein a battery-driven electronic device containing a secondary battery is provided in a power supply section and electrical power is supplied thereto by non-contact, the non-contact charger comprising a primary side coil, which supplies power by electromagnetic induction, and a secondary side coil, which receives power, the primary side and secondary side coils provided facing each other with cases therebetween; the primary side coil comprising a U-shaped magnetic core having a leg at each end thereof, and windings which are wound around the magnetic legs; and the secondary side coil comprising a U-shaped magnetic core having a leg at each end thereof, and a winding which is wound around a common magnetic core of the U-shaped magnetic core; the cross-sectional area of the magnetic legs of the primary side coil being greater than the cross-sectional area of the magnetic legs of the secondary side coil.

In the secondary side coil, the distance between the open ends of the magnetic legs of the magnetic core is greater than the common magnetic core, and, in the primary side coil, the base section of the cross-sectional area of the magnetic legs of the magnetic core is wider than the tip section thereof Therefore, magnetic flux, generated in the primary side coil, is efficiently supplied to the secondary side coil.

Further, a braided wire is used as the material for the winding of at least one of the primary side coil and the secondary side coil.

According to the non-contact charger of the present invention, a battery-driven electronic device containing a secondary battery is provided in a power supply section and electrical power is supplied thereto by non-contact. The non-contact charger comprises a primary side coil and a secondary side coil, the primary side coil supplies power to the secondary side coil by electromagnetic induction. The primary side and secondary side coils face each other with a case therebetween. The primary side coil comprises a U-shaped magnetic core having a leg at each end thereof, and windings which are wound around the magnetic legs. The secondary side coil comprises a U-shaped magnetic core having a leg at each end thereof, and a winding which is wound around a common magnetic core of the U-shaped magnetic core. The cross-sectional area of the magnetic legs of the primary side coil is greater than the cross-sectional area of the magnetic legs of the secondary side coil.

In the secondary side coil, the distance between the open ends of the magnetic legs of the magnetic core is greater than the common magnetic core, and, in the primary side coil, the base section of the cross-sectional area of the magnetic legs of the magnetic core is wider than the tip section thereof. Therefore, the secondary side coil can be made small, light, and thin, and can obtain the required power.

Furthermore, a braided wire, which is made by braiding cluster wires, each comprising multiple insulated single-wires, so that the positions of the cluster wires change alternately inside and outside, is used as the material for the winding of at least one of the primary side coil and the secondary side coil. Therefore, when the magnetic flux generated by one of the coils has intersected with the winding of the other coil without passing the magnetic core of the other coil, loss resulting from the eddy current of the other coil can be reduced, helping to reduce loss in the secondary side coil and supply the required power.

DESCRIPTION OF THE PREFERRED EMBODIMENTS

Figure 1:
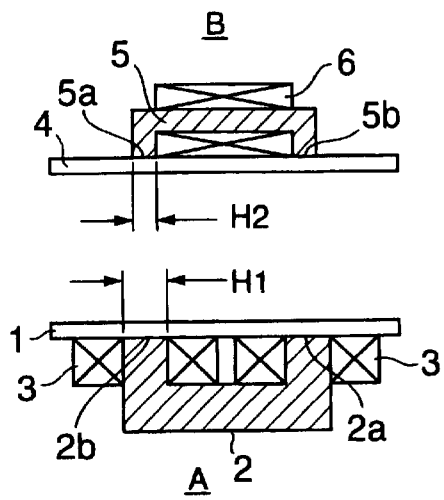
FIG. 1 is a cross-sectional view of an embodiment of a non-contact charger of the present invention.
Figure 2:
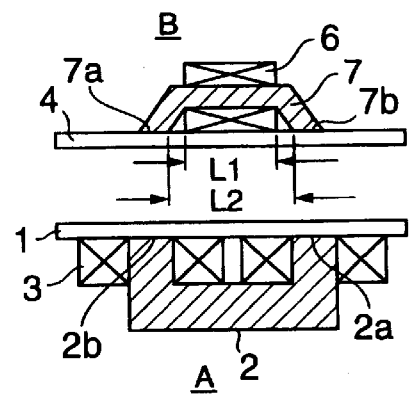
FIG. 2 is a cross-sectional view of another embodiment of a non-contact charger of the present invention.
Figure 3:
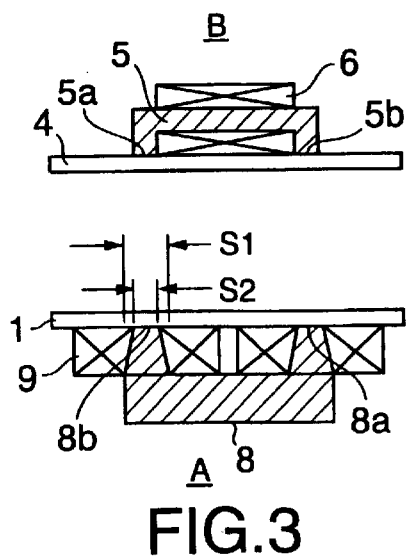
FIG. 3 is a cross-sectional view of another embodiment of a non-contact charger of the present invention.
Figure 4:
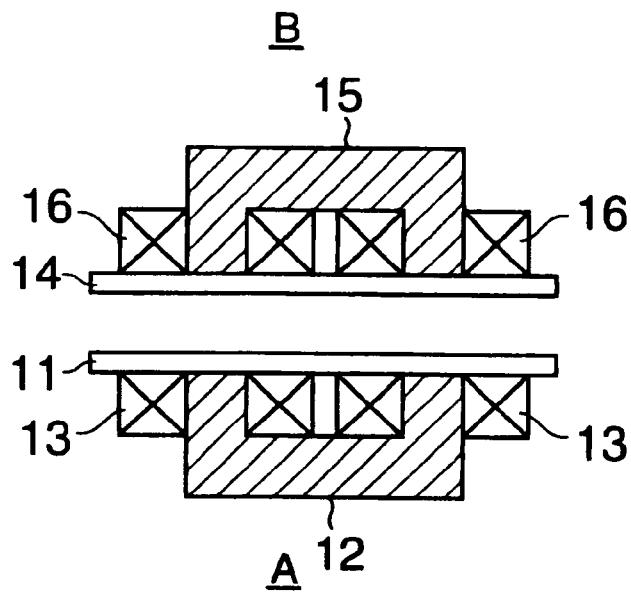
FIG. 4 is a cross-sectional view of a conventional non-contact charger.
Figure 5:
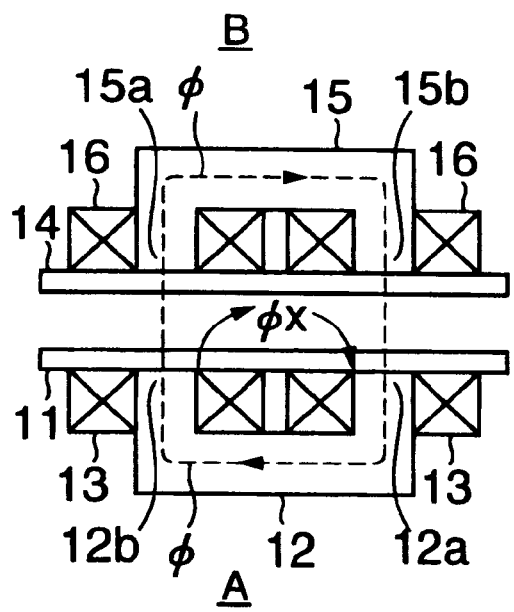
FIG. 5 is a diagram showing magnetic flux distribution of a conventional non-contact charger.

The non-contact charger of the present invention will be explained using FIGS. 1 to 3. In FIGS. 1 to 3, the same parts are represented by the same reference codes.

FIG. 1 is a cross-sectional view of an embodiment of the non-contact charger according to the present invention.

In FIG. 1, reference code A represents a primary side coil, and reference code B represents a secondary side coil. In the primary side coil A, reference code 1 represents a case, reference code 2 represents a U-shaped magnetic core, reference codes 2a and 2b represent magnetic legs at each end of the U-shaped magnetic core, and reference code 3 represents a winding which is wound around the magnetic legs 2a and 2b at each end. In the secondary side coil B, reference code 4 represents a case, reference code 5 represents a U-shaped magnetic core, reference codes 5a and 5b represent magnetic legs at each end of the U-shaped magnetic core, and reference code 6 represents a winding which is wound around the magnetic core at a common section of the magnetic legs 5a and 5b at each end.

Since the primary side coil A is provided on a table or the like, and may acceptably be larger than the secondary side coil B, the cross-sectional area Hi of the U-shaped magnetic core 2 is increased prior to providing the winding 3 around the magnetic legs 2a and 2b at each end. The secondary side coil B is portable and can be carried by a person; to enable it to be made as small as possible, the cross-sectional area H2 of the U-shaped magnetic core 5 is reduced, the winding 6 is wound around a common magnetic core, and the distance between the magnetic legs 5a and 5b at each end matches the distance between the magnetic legs 2a and 2b at each end of the primary side coil A, so that the magnetic axes are aligned. By winding the winding 3 around the common magnetic core of the U-shaped magnetic core 5, which is thin and has a wider distance between its magnetic legs, the charger can be made small and thin.

The magnetic legs 2a and 2b at each end of the primary side coil A and the magnetic legs 5a and 5b at each end of the secondary side coil B are arranged so as to face each other with the cases 1 and 4 therebetween.

Thus, by using a small, light, and thin U-shaped magnetic core 2 in the secondary side coil, the overall structure is made lighter and can be used in a portable electronic device.

FIG. 2 shows a cross-sectional view of another embodiment of the non-contact charger of the present invention. In FIG. 2, the secondary side coil B uses a U-shaped magnetic core 7 in which the distance L2 between open ends of the magnetic legs 7a and 7b (open end) is greater than the distance L1 between bases of the common magnetic core. To reduce the magnetic flux (leaked flux) which returns directly to the magnetic core 2 of the primary side coil A without allowing the magnetic flux, which was generated in the primary side coil A, to enter the magnetic core 7 of he secondary side coil B, the distance between the magnetic legs 2a and 2b of the primary side coil A is increased, and the magnetic axes are aligned. This increases the magnetic transmission efficiency, and enables the charger to be made small, thin, and light.

FIG. 3 is a cross-sectional view of another embodiment of the non-contact charger of the present invention.

In FIG. 3, the primary side coil A uses a U-shaped magnetic core 8 in which the cross-sectional areas of the magnetic legs 8a and 8b at each end thereof have been adjusted so that the tip sections S2 are narrower than the base sections S1. By winding the winding 9 so as to fit the magnetic core 8, the flow of the magnetic flux is contained toward the open ends, thereby reducing the magnetic flux (leaked flux) which returns directly to the primary side coil A without allowing the magnetic flux, which was generated in the primary side coil A, to enter the magnetic core 5 of the secondary side coil B, and increasing the magnetic transmission efficiency by narrowing down the flow of the magnetic flux toward the open ends of the magnetic cores 8.

Further, in each of the above embodiments, a braided wire, which is made by braiding cluster wires, each comprising multiple insulated single-wires, so that the positions of the cluster wires change alternately inside and outside, is used as the material for the winding of at least one of the primary side coil and the secondary side coil. Therefore, when the magnetic flux generated by one of the coils has intersected with the winding of the other coil without passing the magnetic core of the other coil, loss resulting from the eddy current of the other coil can be reduced, helping to reduce loss in the secondary side coil and supply the required power.

The non-contact charger of the present invention is not limited to the embodiments described above. For example, the cross-sectional shape of the U-shaped magnetic core made be round, square, polygonal, and the like. Further, although the braided wire, which is made by braiding cluster wires, each comprising multiple insulated single-wires, so that the positions of the cluster wires change alternately inside and outside, is used as the material for the winding of at least one of the primary side coil and the secondary side coil, a cluster wire which has been complexly braided from single-wire cluster wires (Litz wire, twisted wire, etc.) is an acceptable alternative.

As described above, the non-contact charger of the present invention comprises the primary side coil and the secondary side coil use U-shaped magnetic cores having magnetic legs at each end, a winding is provided around the magnetic legs of the primary side coil and a winding is provided around a common magnetic core of the secondary side coil, thereby making the secondary side coil small, thin, and light, and consequently enabling the overall structure to be made light and convenient for use in a portable electronic device. Further, by changing the shape of the magnetic legs of the U-shaped magnetic cores which face each other from the primary side and secondary side coils, magnetic flux which is generated in the primary side coil can be supplied while reducing the leakage of magnetic flux to the secondary side coil, increasing the magnetic transmission efficiency.

What is claimed is:

1. A non-contact charger wherein a battery-driven electronic device containing a secondary battery is provided in a power supply section and electrical power is supplied thereto by non-contact, the non-contact charger comprising:

a primary side coil and a secondary side coil, the primary side coil supplying power to the secondary side coil by electromagnetic induction, the primary side and secondary side coils being provided to face each other with a case therebetween; the primary side coil comprising a U-shaped magnetic core having a leg at each end thereof, and windings which are wound around the magnetic legs; and the secondary side coil comprising a U-shaped magnetic core having a leg at each end thereof, and a winding which is wound around a common magnetic core of the U-shaped magnetic core; the cross-sectional area of the magnetic legs of the primary side coil being greater than the cross-sectional area of the magnetic legs of the secondary side coil.

2. The non-contact charger according to claim 1, wherein, in the secondary side coil, the distance between the open ends of the magnetic legs of the magnetic core is greater than the common magnetic core.

3. The non-contact charger according to claim 1, wherein, in the primary side coil, the base section of the cross-sectional area of the magnetic legs of the magnetic core is wider than the tip section thereof.

4. The non-contact charger according to claim 1, wherein a braided wire is used as the material for the winding of at least one of the primary side coil and the secondary side coil.

* * * * *